Patented Apr. 27, 1943

2,317,855

UNITED STATES PATENT OFFICE 2,317,855

REFRACTORY BODY

Leonard H. Hepner and Roland E. Tucker, Trenton, N. J., assignors to Crane Co., Chicago, Ill., a corporation of Illinois No Drawing. Application May 9, 1940, Serial No. 334,164

1 Claim. (Cl. 106—45)

This invention pertains to an improvement in a fire clay body, and more particularly it relates to the addition of alumina to a fire clay body, as for example, of the general analysis hereinafter defined such as is used in the manufacture of plumbing ware including closet bowls, lavatories, closet tanks, laundry tubs and the like.

Heretofore it has been found that because of the large amount of free silica present in such fire clays as are used in this type of ware there has been dunting trouble. We have found that by the addition of alumina, such as the fused type, the strength of such clay body is increased. In addition, there has been a substantial reduction in the moisture expansion, with a consequent increase in the resistance to craze.

We have further observed that as a result of the addition of fused alumina to the fire clay body there is a substantial reduction in the thermal expansion and also that there is a uniform rate of expansion of the body, thereby contributing to a higher resistance to thermal shock.

In a copending patent application identified as Serial No. 252,207, filed January 21, 1939, by one of the present coinventors and now issued as U. S. Patent No. 2,257,380, granted September 30, 1941, it was disclosed that the addition of certain amounts of pyrophyllite imparts several desirable properties to the fire clay body of the character therein described. In the instant application we have found that the addition of pyrophyllite or similar silicate material, and alumina to the body produces physical characteristics uncommon to the addition of either material alone. For the latter reason, and as hereinafter shown in greater detail, we have stated in the detailed limits that the pyrophyllite or silicate mineral content may be optionally varied from 0 to 20 per cent.

It is believed that by the addition of alumina, and in combining the latter with the free silica present in the fire clays used in this class of ware, crystallization in the form of mullite occurs, the latter being an alumino-silicate ($3Al_2O_3 \cdot 2SiO_2$) which is conceded to be a desirable constituent of ceramic bodies, because of its known ability to add strength and toughness. Of course, whether or not mullite was formed was not so significant, as was the fact that the alumina combines with the silica and removes that silica as a free material, the alumina being added in the form of fused alumina grain. Of course, the manner of addition is not absolutely necessary insofar as the results of our invention are concerned.

We have found upon microscopic examination of the fire clay body embodying our invention that a compact and more glassy bond is formed, and within this bond very fine needle-like crystals could be noticed, indicating the apparent formation of mullite. In addition, large particles of silica could be detected, while few small particles were evident; also many alumina grains were seen, but they did not have sharp outlines, indicating a partial attack.

Merely for illustrative purposes, it is mentioned that a semi-porcelain once fired grog composition comprising the following ingredients has given satisfactory results:

*Basic composition*

|  | Wet basis | Dry basis |
| --- | --- | --- |
|  | Per cent | Per cent |
| Clay | 37.5 | 42.8 |
| Grog | 35.0 | 40.0 |
| Fused alumina | 15.0 | 17.2 |
| Water | 12.5 | |

Obviously the above percentages are not given to define accurately the scope or the application of our invention, but of course may be varied within the spirit of the invention as defined by the claim.

The range of elements or ingredients which has been usefully employed is:

|  | Per cent |
| --- | --- |
| Clay | 15 to 80 |
| Grog (pre-fired clay) | 10 to 85 |
| Fused alumina | At least 5 |
| Flint | 0 to 20 |
| Metallic oxide | 0 to 5 |
| Silicate mineral such as pyrophyllite | 0 to 20 |

Of course, as stated in the previously referred to patent application, the above mixture of clays may be obtained from various localities, but for best results for the purposes intended and previously herein referred to, the clays may be classified as those suitable for semi-porcelain once fired grog sanitary ware.

The screen analysis of fused alumina grains received is preferably, although not necessarily, conducted by washing 100 grams through 325 mesh screen and then re-screening on 120 mesh, 200 mesh and 325 mesh with the results being expressed as the per cent material on each of these screens, before being added to the mix in the clay or in the grog.

The resultant mixture is then prepared in the usual manner for casting or for pressing into the molds, subsequently to which it may be dried, slipped, glazed and fired in the manner commonly understood and done by those skilled in the art.

Our invention is modifiable within the scope of the appended claim, construed in the terms of the related art.

We claim:

In a semi-porcelain once fired grog sanitary ware made from a mixture of approximately 42% clay, approximately 40% of pre-fired clay, and approximately 17% of alumina.

LEONARD H. HEPNER.
ROLAND E. TUCKER.